(12) United States Patent
Wang

(10) Patent No.: US 11,785,310 B2
(45) Date of Patent: *Oct. 10, 2023

(54) SYSTEMS AND METHODS FOR CONFLICT DETECTION BASED ON USER PREFERENCES

(71) Applicant: Rovi Guides, Inc., San Jose, CA (US)

(72) Inventor: Ti-Shiang Wang, Lexington, MA (US)

(73) Assignee: Rovi Guides, Inc., San Jose, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/391,712

(22) Filed: Aug. 2, 2021

(65) Prior Publication Data

US 2022/0030321 A1    Jan. 27, 2022

Related U.S. Application Data

(63) Continuation of application No. 17/079,643, filed on Oct. 26, 2020, now Pat. No. 11,109,110, which is a
(Continued)

(51) Int. Cl.
*H04N 21/488* (2011.01)
*H04N 21/422* (2011.01)
(Continued)

(52) U.S. Cl.
CPC ......... *H04N 21/4882* (2013.01); *G06F 3/167* (2013.01); *H04N 21/42203* (2013.01);
(Continued)

(58) Field of Classification Search
CPC . H04N 21/42203; H04N 21/466–4661; H04N 21/4882; H04N 21/4394;
(Continued)

(56) References Cited

U.S. PATENT DOCUMENTS 6,239,794 B1   5/2001  Yuen et al.
6,564,378 B1   5/2003  Satterfield et al.
(Continued)

FOREIGN PATENT DOCUMENTS

EP    1037463 A2    9/2000
EP    2187636 A1    5/2010

OTHER PUBLICATIONS

Venkataraman, "A natural language interface for search and recommendations of digital entertainment media", Venkataraman et al., "A natural language interface for search and recommendations of digital entertainment media," IBC Conference, Amsterdam (2015).
(Continued)

*Primary Examiner* — Robert J Hance
(74) *Attorney, Agent, or Firm* — Haley Guiliano LLP

(57) ABSTRACT

Systems and methods for detecting a conflict between viewing selections of two users before viewing a media asset. In some aspects, the method comprises receiving an audio input through an audio channel, detecting a first utterance from a first user and a second utterance from a second user in the input of the audio channel, parsing the first utterance and the second utterance, analyzing the first utterance and the second utterance to determine context about the first media asset and the second media asset, and presenting a conflict to the users to display on the media asset.

22 Claims, 7 Drawing Sheets

Related U.S. Application Data continuation of application No. 16/175,544, filed on Oct. 30, 2018, now Pat. No. 10,856,051, which is a continuation of application No. 15/934,082, filed on Mar. 23, 2018, now Pat. No. 10,149,017, which is a continuation of application No. 15/657,752, filed on Jul. 24, 2017, now Pat. No. 9,961,410.

(51) Int. Cl.
*H04N 21/466* (2011.01)
*H04N 21/458* (2011.01)
*H04N 21/45* (2011.01)
*H04N 21/439* (2011.01)
*G06F 3/16* (2006.01)

(52) U.S. Cl.
CPC ... *H04N 21/42206* (2013.01); *H04N 21/4394* (2013.01); *H04N 21/45* (2013.01); *H04N 21/458* (2013.01); *H04N 21/4532* (2013.01); *H04N 21/4583* (2013.01); *H04N 21/466* (2013.01); *H04N 21/4661* (2013.01); *H04N 21/4662* (2013.01)

(58) Field of Classification Search
CPC ........... H04N 21/42206; H04N 21/458; H04N 21/4532; H04N 21/45; H04N 21/4662; H04N 21/4583; G06F 3/167
See application file for complete search history.

(56) References Cited

U.S. PATENT DOCUMENTS

| | | | |
|---|---|---|---|
| 6,795,808 B1* | 9/2004 | Strubbe | G06F 16/90332 704/E15.04 |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,100,694 B1* | 8/2015 | Chandel | H04N 21/4661 |
| 10,521,188 B1* | 12/2019 | Christie | H04N 21/4532 |
| 11,109,110 B2 | 8/2021 | Wang | |
| 2002/0174430 A1 | 11/2002 | Ellis et al. | |
| 2002/0194586 A1* | 12/2002 | Gutta | H04N 21/4661 725/74 |
| 2004/0216168 A1* | 10/2004 | Trovato | H04N 21/4668 725/135 |
| 2004/0218905 A1* | 11/2004 | Green | H04N 21/4438 386/296 |
| 2005/0251827 A1 | 11/2005 | Ellis et al. | |
| 2006/0064721 A1* | 3/2006 | Del Val | H04N 21/4147 725/40 |
| 2007/0186241 A1* | 8/2007 | Sugimoto | H04N 21/482 725/35 |
| 2008/0034391 A1* | 2/2008 | Lehman | H04N 21/4263 386/E5.001 |
| 2008/0127254 A1* | 5/2008 | Nakajima | H04N 21/41265 725/38 |
| 2010/0153885 A1 | 6/2010 | Yates | |
| 2010/0303289 A1* | 12/2010 | Polzin | G06V 40/103 348/135 |
| 2011/0072452 A1* | 3/2011 | Shimy | H04N 21/44218 725/25 |
| 2012/0124456 A1* | 5/2012 | Perez | H04N 21/44218 715/200 |
| 2012/0151511 A1* | 6/2012 | Bernard | H04N 21/4826 725/10 |
| 2014/0244263 A1 | 8/2014 | Pontual et al. | |
| 2015/0185993 A1* | 7/2015 | Wheatley | H04N 21/4621 715/744 |
| 2015/0237412 A1* | 8/2015 | Shimy | H04N 21/42201 725/12 |
| 2016/0029085 A1* | 1/2016 | Mountain | H04N 21/4882 725/43 |
| 2016/0205427 A1* | 7/2016 | Yoon | G06F 3/017 725/34 |
| 2017/0264920 A1* | 9/2017 | Mickelsen | G06V 40/174 |
| 2018/0041805 A1* | 2/2018 | Gibbon | H04N 21/214 |
| 2018/0213284 A1* | 7/2018 | Shekhar | H04N 21/4532 |
| 2021/0144446 A1 | 5/2021 | Wang | |

OTHER PUBLICATIONS

Karanastasi, "A natural language model and a system for managing TV—anytime information from mobile devices", Karanastasi et al., "A natural language model and a system for managing TV—anytime information from mobile devices," Natural Language Processing and Information Systems, pp. 1-12 (2004), 2004.

"Enhanced user interface framework for IPTV terminal devices", Enhanced user interface framework for IPTV terminal devices, Telecommunication Standardization Sector of ITU, International Telecommunication Union, H.703 (Jul. 2016).

* cited by examiner

SYSTEMS AND METHODS FOR CONFLICT DETECTION BASED ON USER PREFERENCES

CROSS-REFERENCE TO RELATED APPLICATION

This application is a continuation of U.S. patent application Ser. No. 17/079,643, filed Oct. 26, 2020, which is a continuation of U.S. patent application Ser. No. 16/175,544, filed Oct. 30, 2018, now U.S. Pat. No. 10,856,051, which is a continuation of U.S. patent application Ser. No. 15/934,082, filed Mar. 23, 2018, now U.S. Pat. No. 10,149,017, which is a continuation of U.S. patent application Ser. No. 15/657,752, filed Jul. 24, 2017, now U.S. Pat. No. 9,961,410, the disclosures of which are hereby incorporated by reference herein in their entireties.

BACKGROUND

Different users sitting in a room may have varied preferences regarding the media assets they would like to view. Conventional media guidance applications do not automatically detect a conflict between users from a conversation between the various users. Instead, conventional media guidance applications require users to look up the different media assets in program guides to determine if media assets conflict. This may be frustrating for the users as they need to spend time determining whether their different preferences conflict and may cause them to miss the scheduled times of their preferred media assets.

SUMMARY

Systems and methods are provided herein for detecting a viewing conflict between a first user and a second user based on a conversation between the first user and the second user. For example, the media guidance application, implemented at a user equipment device, (a television, for example) may detect a conversation between a first user who wants to watch the movie, "Batman," and a second user who wants to watch the movie, "Iron Man." This conversation may be detected by the media guidance application running in the background when the user equipment device is not turned on. In some embodiments, the user equipment device may be turned on and may display a default page (like general guide layout, or layout of apps without displaying any specific media asset for example). Based on this conversation, when the first user or the second user turns the television on, the media guidance application may detect that the timings of the "Batman" and "Iron Man" movie overlap and will generate a notification of the conflict for display on a user equipment device used to display the media asset.

The described method of detecting a viewing conflict between the first user and the second user is better than the conventional method of the detecting conflict, because the described method does not require explicit inputs from the first user and the second user to determine whether the interests of the first user and the second user conflict.

In some aspects, the media guidance application may detect a conversation between the first user and the second user in close proximity to the user equipment used to generate media assets for display, before the user equipment generates any media assets for display. The conversation may contain utterances from the first user and the second user about their preference of media assets. For example, the first user may start talking about his preference to watch "Batman" and the second may start talking about his preference to watch "Iron Man." In such a conversation, the first user may also say something negative about "Iron Man" and the second user may say something negative about "Batman."

In some aspects, one of the first user or the second user may provide an input to the user equipment to generate a media asset. The media guidance application may perform contextual mapping on the detected conversation between the first user and the second user to detect a context from the perspective of the first user and from the perspective of the second user for the various media assets. For example, the first user may say that "I want to watch Batman." And the second user may say "Batman is boring." In this case, the media guidance application may detect that the first user wishes to watch a media asset related to "Batman." In addition, the media guidance application may associate a positive context for "Batman" with the first user and a negative context for "Batman" with the second user. In subsequent conversation, the second user may say "I want to watch Iron Man." The media guidance application may determine that the second user wishes to watch a media asset associated with "Iron Man" and a positive context for "Iron Man" with the second user.

In some embodiments, the media guidance application may determine the scheduled time of the first media asset and the scheduled time of second media asset. For example, the media guidance application determines whether the scheduled time for media assets related to "Batman" and the scheduled time for media assets related to "Iron Man" overlap and whether there is a negative context for at least one of the first media asset or the second media asset.

In some embodiments, the media guidance application may generate for display, a conflict on the user equipment between the first user and the second user based on the context and scheduled times. For example, the media guidance application may determine that a "Batman" movie is scheduled between 9 pm-12 am and an "Iron Man" movie is scheduled between 10 pm-1 am. Thus the media guidance application may generate an alert to display the conflict between the first user and the second user on the user equipment, in order to inform the first user and the second user about the viewing conflict between the first media asset and the second media asset. In some embodiments, if no conflict is detected, the media guidance application may generate an alert displaying 'No conflict' on the user equipment device.

In some embodiments, the detection of a conflict in viewing a media asset between a group of users is based on their conversation. The detection of conflict includes detecting the voice of each user in the group of users. In addition, the detection of conflict includes detecting the content of the conversation to determine the media assets that are mentioned and to determine whether there is any agreement regarding watching one media asset over others during the conversation between the users. Part of detection of conflict includes detecting whether there is any negative context about any of the media assets. In the example described above, a first user and a second user start a conversation regarding watching "Batman" and "Iron Man." The media guidance application analyzes the content of the conversation to determine that the first user is interested in watching media assets related to "Batman" and the second user is interested in watching media assets associated with "Iron Man."

In some embodiments, the first user may say a negative statement about "Iron Man." In some embodiments, the first user and the second user may say something positive about "Batman" and "Iron Man" respectively. The media guidance application assigns context with regards to "Batman" and "Iron Man" to the first user and the second user based on the conversation.

In some embodiments, the media guidance application analyses a segment of conversation between the group of users to determine conflicts between various media assets. The amount of time for which the conversation is monitored may be predetermined. The media guidance application detects that there is more than one media asset being discussed in the conversation, and that the first user and the second user have differing opinions about the media assets being discussed. In the previous example, is determined after the first user or the second user provides a command to generate a media asset for display, the media guidance application analyses the conversation between the first user and the second user for a predetermined period of time before the command to generate is received by the media guidance application. The media guidance application gathers the context information about "Batman" and "Iron Man." In addition, the media guidance application determines whether the scheduled times of the media assets associated with "Batman" and the media assets associated with "Iron Man" overlap. In case the scheduled times of the two shows do not overlap, the media guidance application determines there is no conflict in the viewing of media assets.

In some embodiments, the proposed method is be implemented using devices such as remote control, TV, STB or even an app for mobile phone in close proximity to the user equipment used to generate a media asset for display.

Systems and methods described herein detect a conflict between viewing selections of two users before viewing a media asset, displayed on a user equipment, the method comprising, receiving an audio input through an audio channel, while the media asset is not being generated for display on the user equipment, detecting a first utterance from a first user and a second utterance from a second user in the input of the audio channel, parsing the first utterance and the second utterance to determine a first context provided by the first user and a second context provided by the second user for at least one of a first media asset and a second media asset, detecting a command from the first user or the second user to generate the first media asset or the second media asset for display on the user equipment, extracting, from memory, a first scheduled time for the first media asset and a second scheduled time or the second media asset, based on the first context, the second context, the first scheduled time, and the second scheduled time, determining a conflict between the first user and the second user, wherein the determination of the conflict further comprises detecting at least one of a negative utterance for the first media and a negative utterance of the second media asset, and generating for display, a conflict to the users to display on the user equipment displaying the media asset.

In the above example, the media guidance application detects the preference of a first user to view media assets related to "Batman" and the preference of a second user to view media assets related to "Iron Man" from the conversation between the first user and the second user. The media guidance application also extracts from memory, the scheduled times of "Batman" and "Iron Man," and determines whether they overlap. Based on detecting whether the scheduled times overlap and based on detecting the difference in preference of the first user and the second user, the media guidance application generates a conflict notification for display on the user equipment. In some embodiments, if no conflict is detected, the media guidance application may generate an alert displaying 'No conflict' on the user equipment device.

In some embodiments, the determining the conflict further comprises determining that the first scheduled time and the second scheduled time overlap. In some embodiments, the determining the conflict further comprises extracting, from memory, a first duration of the first media asset and a second duration of the second media asset, from a first metadata of the first media asset and a second metadata of a second media asset, respectively, determining the conflict when the first scheduled time is within the second duration after the second scheduled time, and determining the conflict when the second scheduled time is within the first duration after the first scheduled time. In the above example, the scheduled time of "Batman" is from 9 pm-12 am and the scheduled time of "Iron Man" is from 10 pm to 1 am. In this example, while the times are not completely overlapping, there is a period, namely between 10 pm-1 am that both "Batman" and "Iron Man" overlap and that will lead to a conflict between the first user and the second user.

In some embodiments, the determining the conflict further comprises analyzing the input received through the audio channel for a fixed period of time to determine the first context and the second context about at least one of the first media asset and the second media asset. In the above example, upon receiving a command to generate a media asset on a user equipment, the media guidance application analyses a predetermined length of conversation before the command was received to determine the media assets related to "Batman," "Iron Man" being discussed and the context of the media assets for the first user and the second user.

In some embodiments, determining the first context and the second context further comprises determining a positive context based on detecting that the first utterance or the second utterance include a word with a positive connotation, and determining a negative context based on detecting that the first utterance or the second utterance include a word with a negative connotation. In some embodiments, the first utterance is received through a first device and the second utterance is received through a second device, wherein the first device and the second device are connected to the user equipment via a network. In the above example, the first user may say "I want to watch Batman." This utterance is determined to have phrases of positive connotation positive connotation of the first user for "Batman" like "want to watch." The second user may say "Batman is boring." This utterance is determined to have words of negative connotation of the second user with for "Batman," like "boring." In subsequent conversation, the second user may say, "I want to watch Iron Man." This utterance is similarly determined to have a positive connotation of the second user with "Iron Man." The determined connotations are then put together to determine part of the context of "Batman" and "Iron Man" for the first user and the second user.

In some embodiments, the determining the first context and second context of at least one of the first media asset and the second media asset further comprises identifying a first user profile associated with the first user on the first device and a second profile associated with a second user on the second device, retrieving, from the first user profile, a first plurality of media assets previously viewed by the first user, retrieving, from the second user profile, a second plurality of media assets previously viewed by the second user, determining the first context and the second context of at least one of the first media asset and the second media asset for the first user by comparing the first media asset and the second media asset to the first plurality of media assets, and determining the second context of at least one of the first media asset and the second media asset for the second user by comparing the first media asset and the second media asset to the second plurality of media assets.

In some embodiments, comparing the first media asset and the second media asset to the first collection of the media assets further comprises retrieving from memory, a metadata for at least one media asset in the first collection of media assets, respectively, extracting from the retrieved metadata, at least one tag describing the at least one media asset from the first collection of media assets, retrieving from memory, a first metadata of the first media asset and a second metadata of the second media asset, wherein the first metadata includes at least a first tag and the second metadata contains at least a second tag, and comparing the at least one tag with the first tag and the second tag to determine context of the first media asset and the second media asset for the first user. In some embodiments, comparing first tag and the second tag to determine context further comprises determining a positive context based on the first tag matching the at least one tag. In the above example, the context determination of the first user and the second user for "Batman" and "Iron Man" may also include determining a watch history of the first user and the second user. The watch history of the first user may contain a television cartoon of "Batman" and a movie "Batman" v Superman. Both of these media assets may be tagged with keywords associated with "Batman" like "Batman," "Alfred," "Robin," "Mr. Fox," "Bat mobile," "Joker," "Catwoman," etc. The media guidance application may compare the tags from the watch history of the first user to the tags of the media assets associated with "Batman." Based on determining a match between the tags of the watch history to the tags of the media assets associated with "Batman," the media guidance application may supplement the positive context of the first user for "Batman." Similarly, the media guidance application may extract tags from the watch history of the second user and compare the tags with the media assets associated with "Iron Man" to supplement the context of the second user for "Iron Man."

It should be noted that the systems, methods, apparatuses, and/or aspects described above may be applied to, or used in accordance with, other systems, methods, apparatuses, and/ or aspects described in this disclosure.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for detecting a viewing conflict between a first user and a second user based on a conversation between the first user and the second user. For example, the media guidance application, implemented at a user equipment device, (a television, for example) may detect a conversation between a first user who wants to watch the movie, "Batman," and a second user who wants to watch the movie, "Iron Man." This conversation may be detected by the media guidance application running in the background of the user equipment device when the user equipment device is not turned on. In some embodiments, the user equipment device may be turned on and may display a default page (like general guide layout, or layout of apps without displaying any specific media asset for example). Based on this conversation, when the first user or the second user turns the television on, the media guidance application may detect that the timings of the "Batman" and "Iron Man" movie overlap and will generate a notification of the conflict for display on a user equipment device used to display the media asset.

Figure 1:
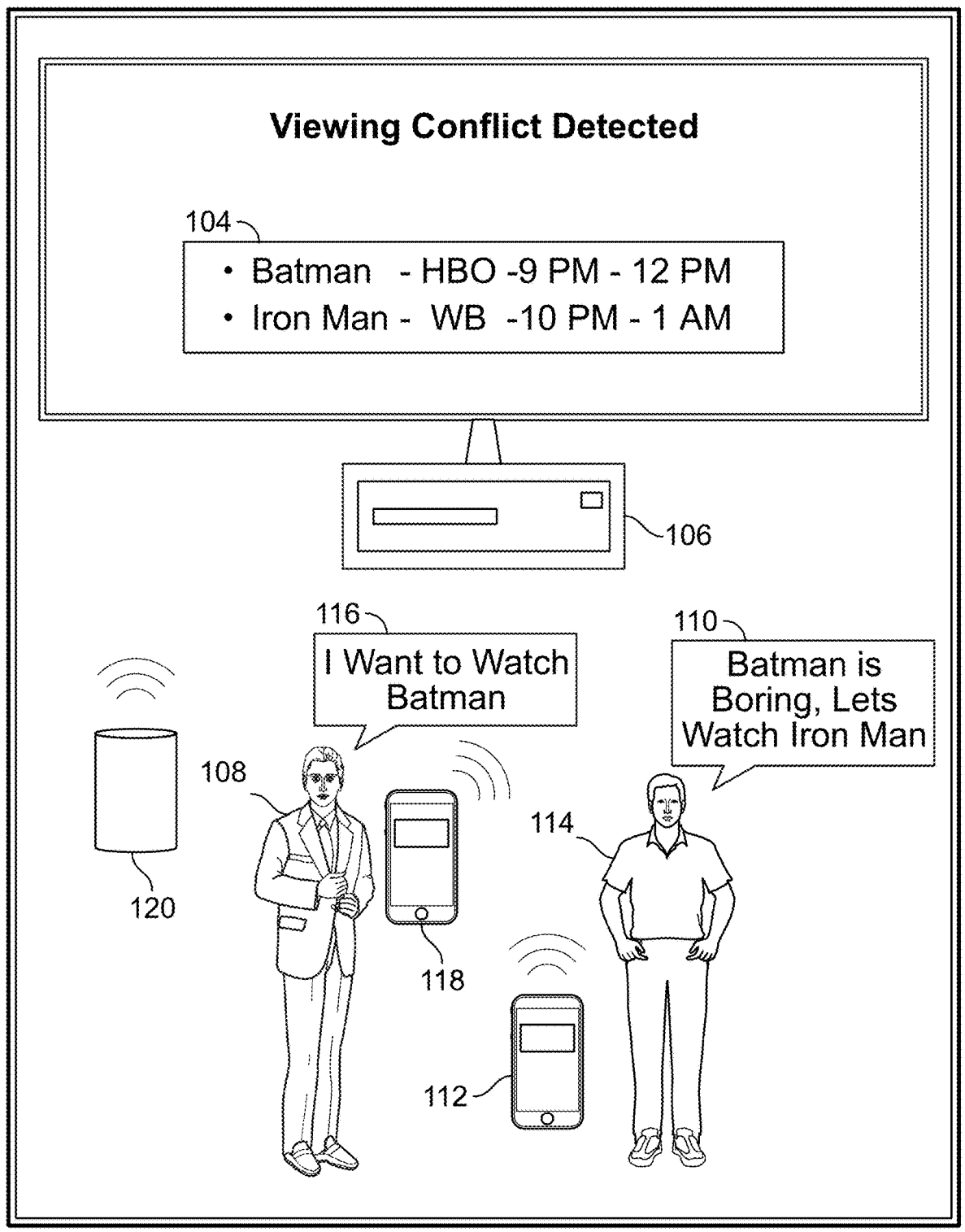
FIG. 1 shows an illustrative example of an interaction between a media guidance application and a user, the interaction containing viewing conflict, in accordance with some embodiments of the disclosure.

FIG. 1 shows an illustrative example of an interaction between a media guidance application and a user, the media guidance application depicting a viewing conflict between a first user and a second user, in accordance with some embodiments of the disclosure. As depicted, FIG. 1 includes a user equipment device 106, users, 108, 114, and user devices 112, 118, and 120. User equipment device 106 may include, for example, a TV, a computer, an intelligent personal assistant (IPA), a smart-phone, and the like. The user equipment device 106 may execute a media guidance application in the background while the user equipment device 106 does not generate a media asset for display.

As shown in FIG. 1, the media guidance application may detect a conversation between the first user and the second user in close proximity to the user equipment device 106 used to generate media assets for display, before the user equipment device 106 generates any media assets for display. In some embodiments, the user equipment device may be turned on and may display a default page (like general guide layout, or layout of apps without displaying any specific media asset for example). The conversation may contain utterances 110, 116 from the first user 108 and the second user 114 about their preference of media assets. The first user 108 starts talking about his preference to watch "Batman" and the second user 114 may start talking about his preference to watch "Iron Man." In such a conversation, the first user 108 utters "I want to watch Batman." (Speech bubble 116). The second user 114 utters, "Batman is boring, let's watch Iron Man." (Speech bubble 110). The utterance 116 of the first user 108 and the utterance 110 second user 114 may be received by any user device 120, 118, or 112. In some embodiments, the user equipment device 106 may also receive the utterances 116, 110 of users 108 and 114. The user devices 112, 118, and 120 may be connected to the user equipment device 106 over a network like the internet.

The media guidance application determines the scheduled time of the first media asset and the scheduled time of second media asset from the conversation. As shown in FIG. 1, the media guidance application determines the scheduled time for a "Batman" movie is 9 PM-12 AM and an "Iron Man" movie is scheduled between 10 PM-1 AM. Thus the media guidance application generates an alert 104 to display the conflict between the first user 108 and the second user 114 on the user equipment device 106, in order to inform the first user 108 and the second user 114 about the viewing conflict between the Batman movie and the Iron Man movie.

Figure 2:
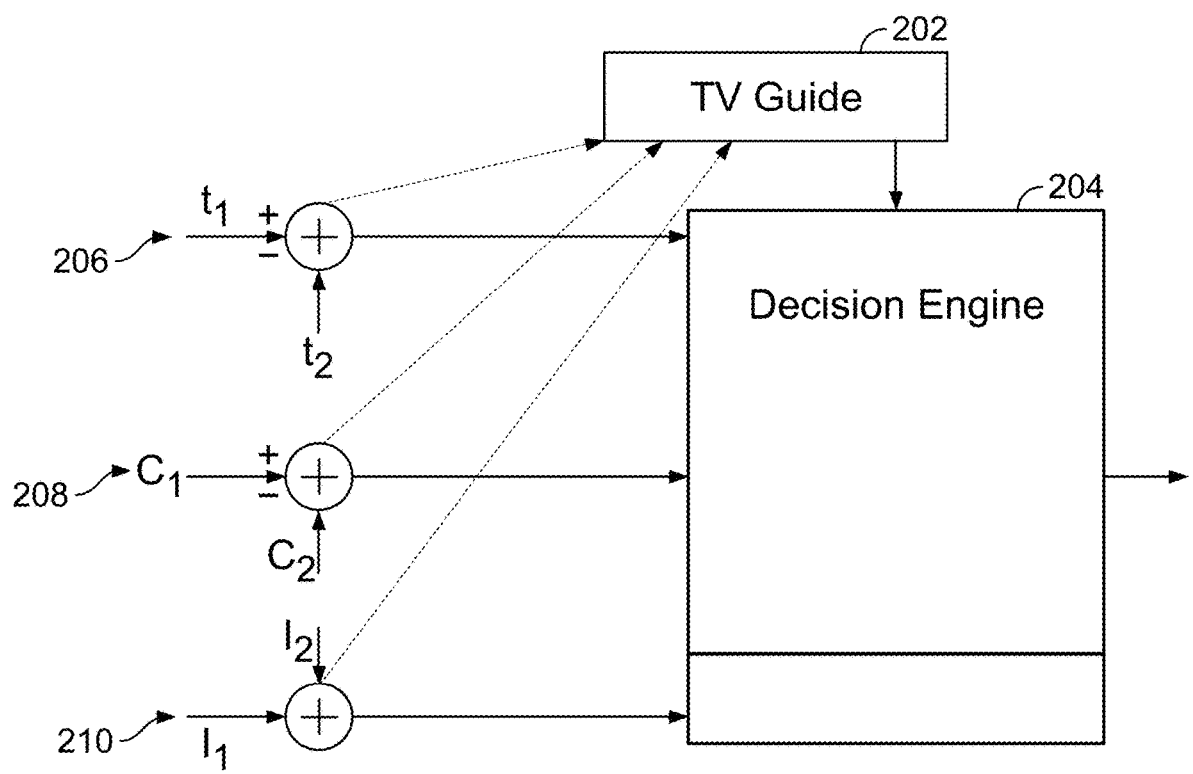
FIG. 2 shows an illustrative example of a decision engine part of a media guidance application containing various inputs, in accordance with some embodiments of the disclosure.

FIG. 2 shows an illustrative example of a decision engine in a media guidance application containing various inputs, in accordance with some embodiments of the disclosure. The decision engine 204 shown in FIG. 2 may be part of user equipment device 106. Based on detecting the conversation between the first user 108 and the second user 114, the decision engine 204 detects whether there is a viewing conflict between the first user 108 and the second user 114. The decision engine 204 receives various inputs from the first user 108 and the second user 114 and the media guidance application 202. The media guidance application 202 may be implemented at user equipment device 106 as shown in FIG. 1. In some embodiments, media guidance application 202 may be obtained from a service provider to provide TV-guide information. The first input 206 to decision engine 204 is a scheduled time t1 of the first media asset, and a scheduled time t2 of the second media asset. As depicted in FIG. 1, the first media asset may be the "Batman" movie and the second media asset may be the "Iron Man" movie. In some embodiments, t1 and t2 may also include a scheduled duration of the respective movies and the decision engine 204 may calculate the scheduled end times of the two movies. In some embodiments, t1 and t2 may include end times of the two movies respectively, and the decision engine may calculate the duration of the two movies based on the scheduled start time and end time of the movies. The second input 208, to decision engine 204 is a first channel c1 that broadcasts the "Batman" movie and a second channel c2 that broadcasts the "Iron Man" movie. In some embodiments, the channels c1 and c2 may be retrieved by the media guidance application 202 from the metadata of the respective movies. The third input 210, to decision engine 204 is a first user input i1 a second user input i2. In some embodiments, the decision engine 204 determines that the conversation in FIG. 1 had at least two participants user 108 and user 114. In some embodiments, the user inputs i1 and i2 may include the utterances of speech bubbles 116 and 110 of the first user 108 and the second user 114 respectively. Part of detection of conflict by decision engine 204 includes detecting whether there is any negative context about any of the movies. In the example described in FIG. 1, the media guidance application 202 analyzes the content of the conversation to determine that the first user 108 is interested in watching media assets related to "Batman" and the second user 114 is interested in watching media assets associated with "Iron Man." The speech bubbles 116 and 110 are for illustrative purposes only. The association of context for the first user 108 and the second user 114 to the two movies may be determined from many different conversations between the users. In some embodiments, not shown in FIG. 1, the first user 108 may say a negative statement about "Iron Man." In some embodiments, the first user 108 and the second user 114 may say something positive about "Batman" and "Iron Man" respectively. In some embodiments, the first user 108 and second user 114 may only discuss one media asset (e.g. only one of the "Batman" or "Iron Man" movies). The media guidance application 202 assigns context with regards to "Batman" and "Iron Man" to the first user 108 and the second user 114 based on the conversation detected. The decision engine 204 uses inputs 206, 208 and 210 to determine a viewing conflict between the first user 108 and the second user 114. The detection of this conflict is described in detail in FIGS. 7-9. In some embodiments, if no conflict is detected, the media guidance application may generate an alert displaying 'No conflict' on the user equipment device.

In some embodiments, the media guidance application analyses a segment of conversation between the group of users to determine conflicts between various media assets. The amount of time for which the conversation is monitored may be predetermined. The media guidance application detects that there is more than one media asset being discussed in the conversation, and that the first user and the second user have differing opinions about the media assets being discussed. In the previous example, is determined after the first user or the second user provides a command to generate a media asset for display, the media guidance application analyses the conversation between the first user and the second user for a predetermined period of time before the command to generate is received by the media guidance application. The media guidance application gathers the context information about "Batman" and "Iron Man." In addition, the media guidance application determines whether the scheduled times of the media assets associated with "Batman" and the media assets associated with "Iron Man" overlap. In case the scheduled times of the two shows do not overlap, the media guidance application determines there is no conflict in the viewing of media assets.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figures 3, 4:
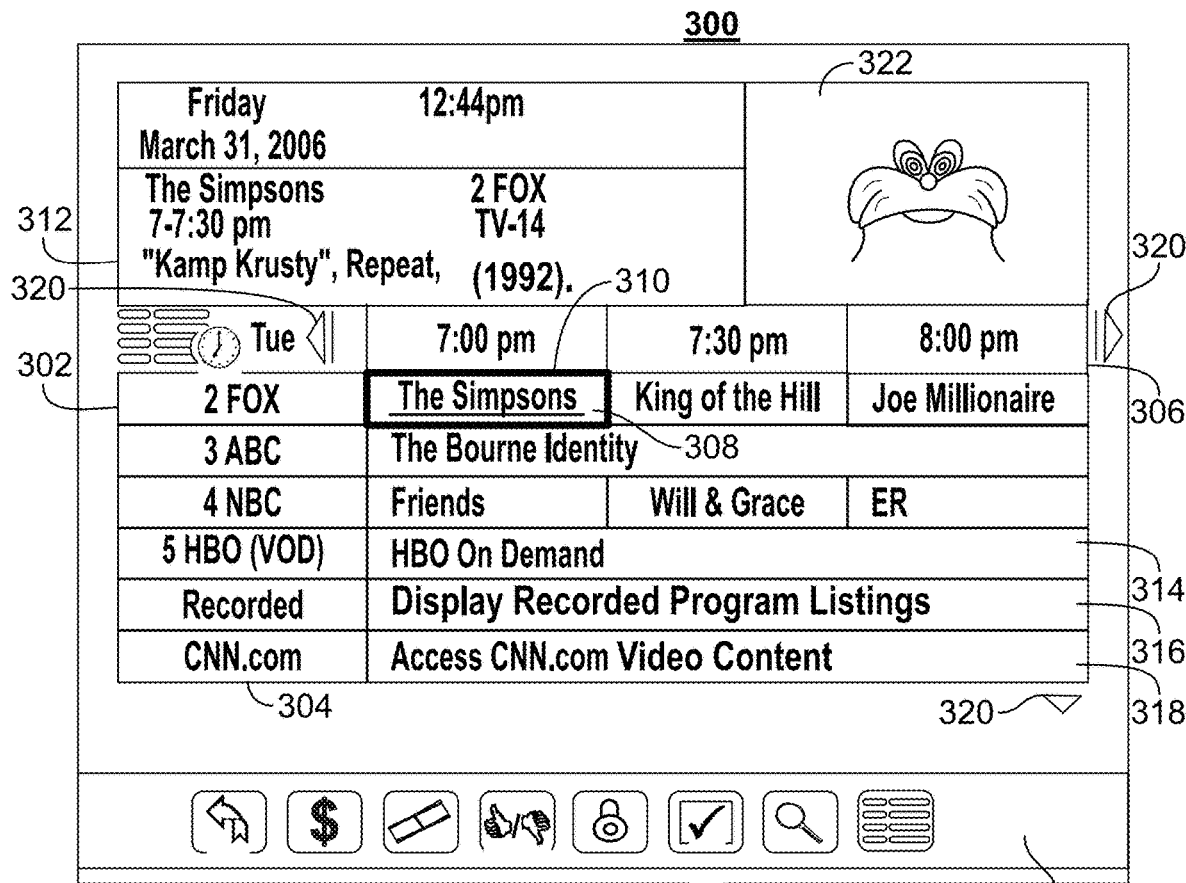
FIG. 3 shows an illustrative embodiment of a display screen that may be used to provide media guidance application listings and other media guidance information, in accordance with some embodiments of the disclosure.
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
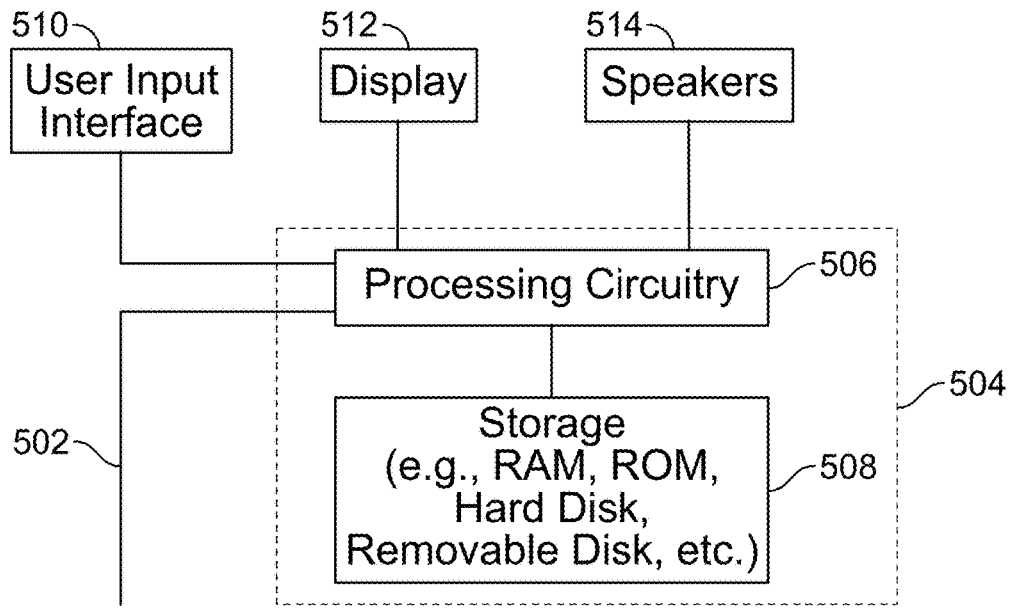
FIG. 5 is a block diagram of an illustrative user equipment (UE) device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
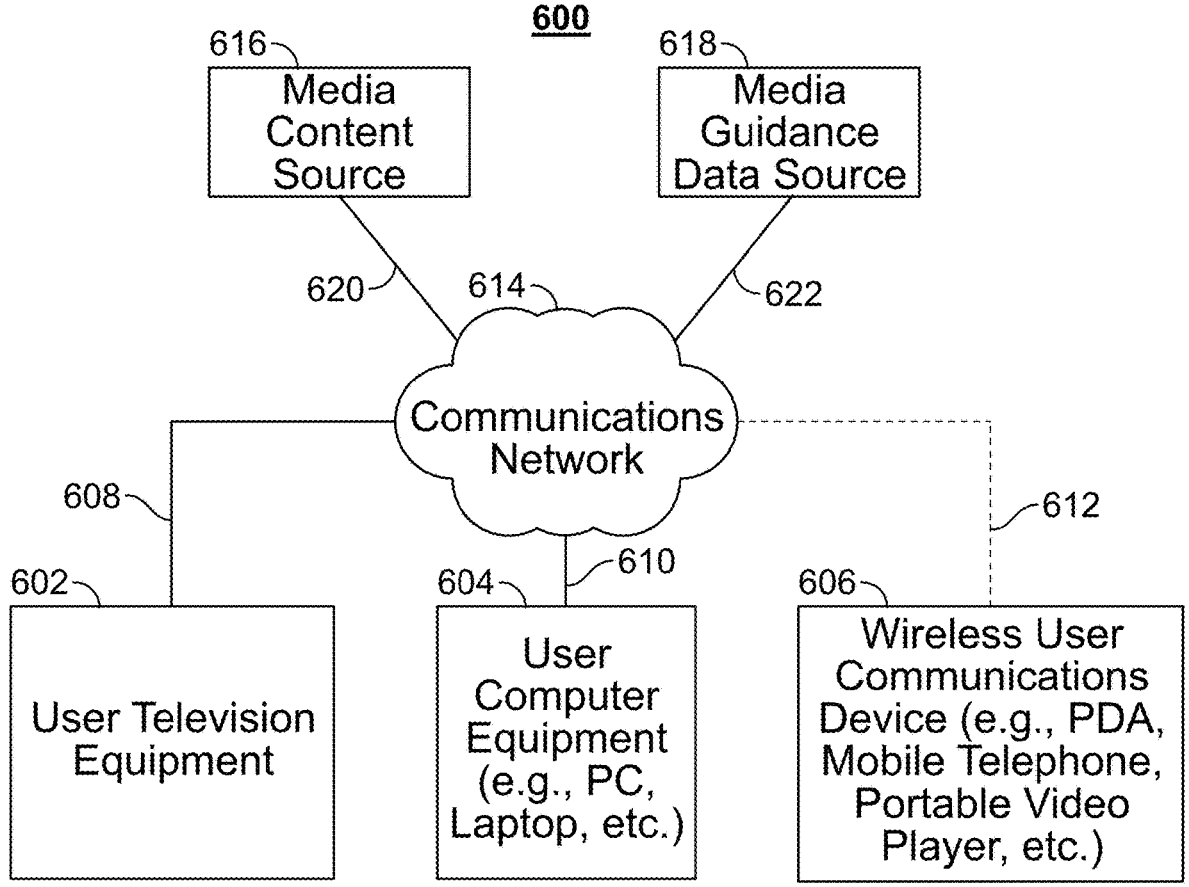
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
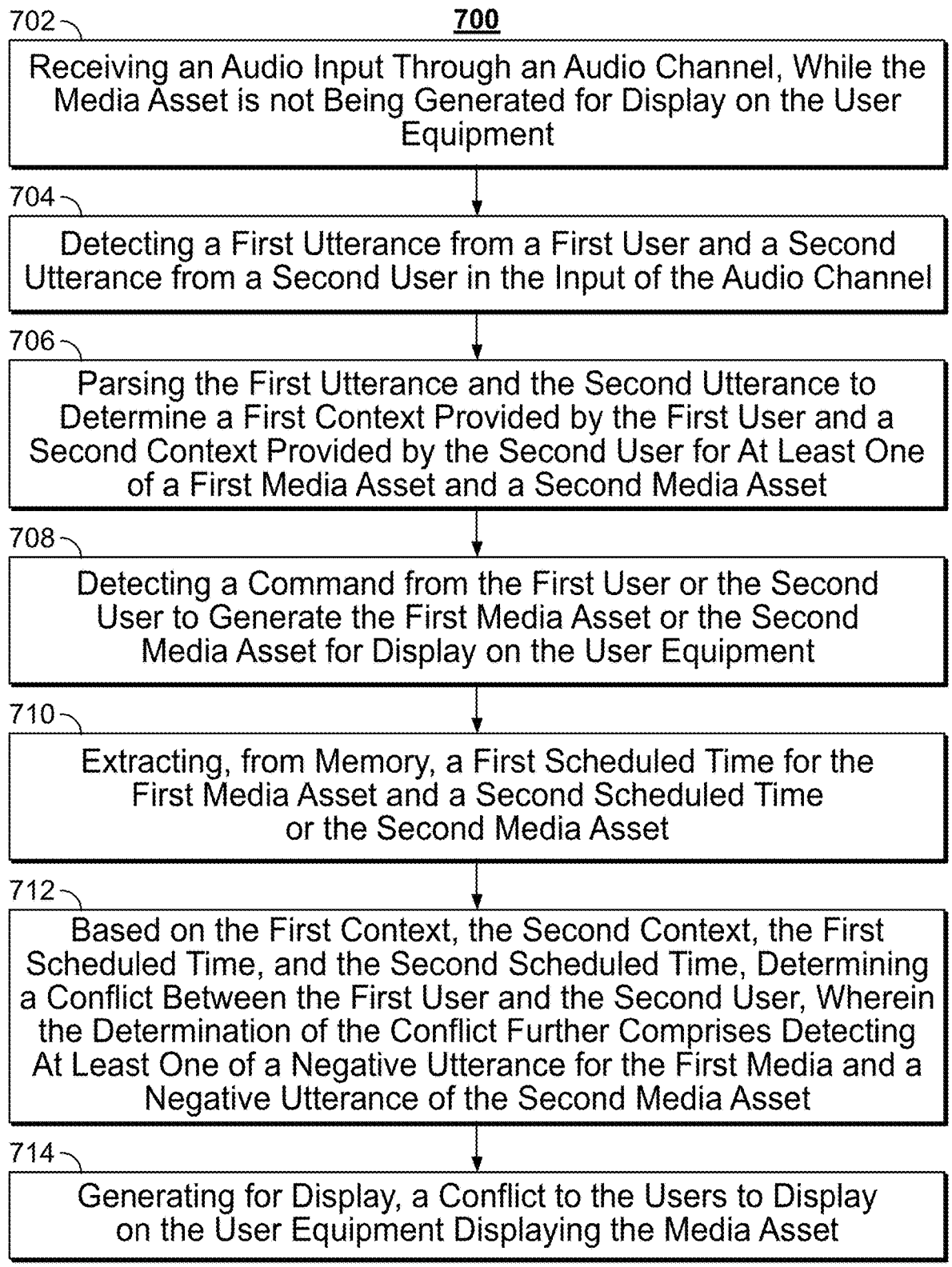
FIG. 7 depicts an illustrative flowchart of a process for detecting viewing conflicts based on user preferences, in accordance with some embodiments of the disclosure.

FIG. 7 depicts an illustrative flowchart of a process for detecting viewing conflicts based on user preferences, in accordance with some embodiments of the disclosure. Process 700 may be executed by control circuitry 504 (e.g. in a manner instructed to control circuitry 504 by the media guidance application). Control circuitry 504 may be part of remote server separated from the user equipment device 106 by of communication network 614.

Process 700 begins at 702, when control circuitry 504 receives an audio input through an audio channel, while the media asset is not being generated for display on the user equipment. For example, as shown in FIG. 1 control circuitry 504 may receive an audio conversation from the first user 108 and the second user 114.

At 704, control circuitry 504 detects a first utterance 116 from a first user 108 and a second utterance 110 from a second user 114 in the input of the audio channel. For example, as shown in FIG. 1 control circuitry 504 may detect a first utterance 116 from the first user 108 and a second utterance 110 from the second user 114.

At 706, control circuitry 504 parses the first utterance 116 and the second utterance 110 to determine a first context provided by the first user 108 and a second context provided by the second user 114 for at least one of a first media asset and a second media asset. The determination of the context includes analyzing utterances 116 and 110 from the first user 108 and the second user 114 to determine what they have said about at least one media asset. As shown in FIG. 1, the first user 108 says "I want to watch Batman" and the second user 114 says "Batman is boring." Using the first utterance 116 and the second utterance 110, the control circuitry 504 determines a context for the first user 108 and the second user 114 for at least the "Batman" movie.

At 708, control circuitry 504 detects a command from the first user 108 or the second user 114 to generate the first media asset or the second media asset for display on the user equipment device 106. In some embodiments, the command may be a request to turn on the user equipment device 106. In some embodiments, one of the first user 108 or the second user 114 may use one of the user devices 112, 118, and 120 to send a request to user equipment device 106 to generate the "Batman" or "Iron Man" movie on user equipment device 106.

At 710, control circuitry 504 extract, from memory, a first scheduled time for the first media asset and a second scheduled time for the second media asset. In some embodiments, the media guidance application 202 implemented on user equipment device 106 may contain control circuitry 504 that will extract the times of the "Batman" and "Iron Man" movies to be broadcast.

At 712, control circuitry 504 based on the first context, the second context, the first scheduled time, and the second scheduled time, determine a conflict between the first user and the second user, wherein the determination of the conflict further comprises detecting at least one of a negative utterance for the first media and a negative utterance of the second media asset. In some embodiments, as shown in FIG. 2, a decision engine 204 may be implemented in media guidance application 202 that receives various inputs (206, 208, and 210) to determine whether there is a viewing conflict between the first user 108 and the second user 114. Input 206 includes the first scheduled time and the second scheduled time as extracted in 710. Input 208 includes a first channel of the first media asset ("Batman movie") and a second channel of the second media asset ("Iron Man" movie). The first and the second channel may be determined by the media guidance application 202. Input 210 includes a first user input i1 a second user input i2. In some embodiments, the decision engine 204 determines that the conversation in FIG. 1 had at least two participants user 108 and user 114. In some embodiments, the user inputs i1 and i2 may include the utterances of speech bubbles 116 and 110 of the first user 108 and the second user 114 respectively. Part of detection of conflict by decision engine 204 includes detecting whether there is any negative context about any of the movies. In the example described in FIG. 1, the media guidance application 202 analyzes the content of the conversation to determine that the first user 108 is interested in watching media assets related to "Batman" and the second user 114 is interested in watching media assets associated with "Iron Man."

At 714, control circuitry 504 generates for display, a conflict to the users to display on the user equipment displaying the media asset. As shown in FIG. 1, in some embodiments, the media guidance application generates alert 104 to display on user equipment device 106 to display the determined viewing conflict between the first user 108 and the second user 114.

Figure 8:
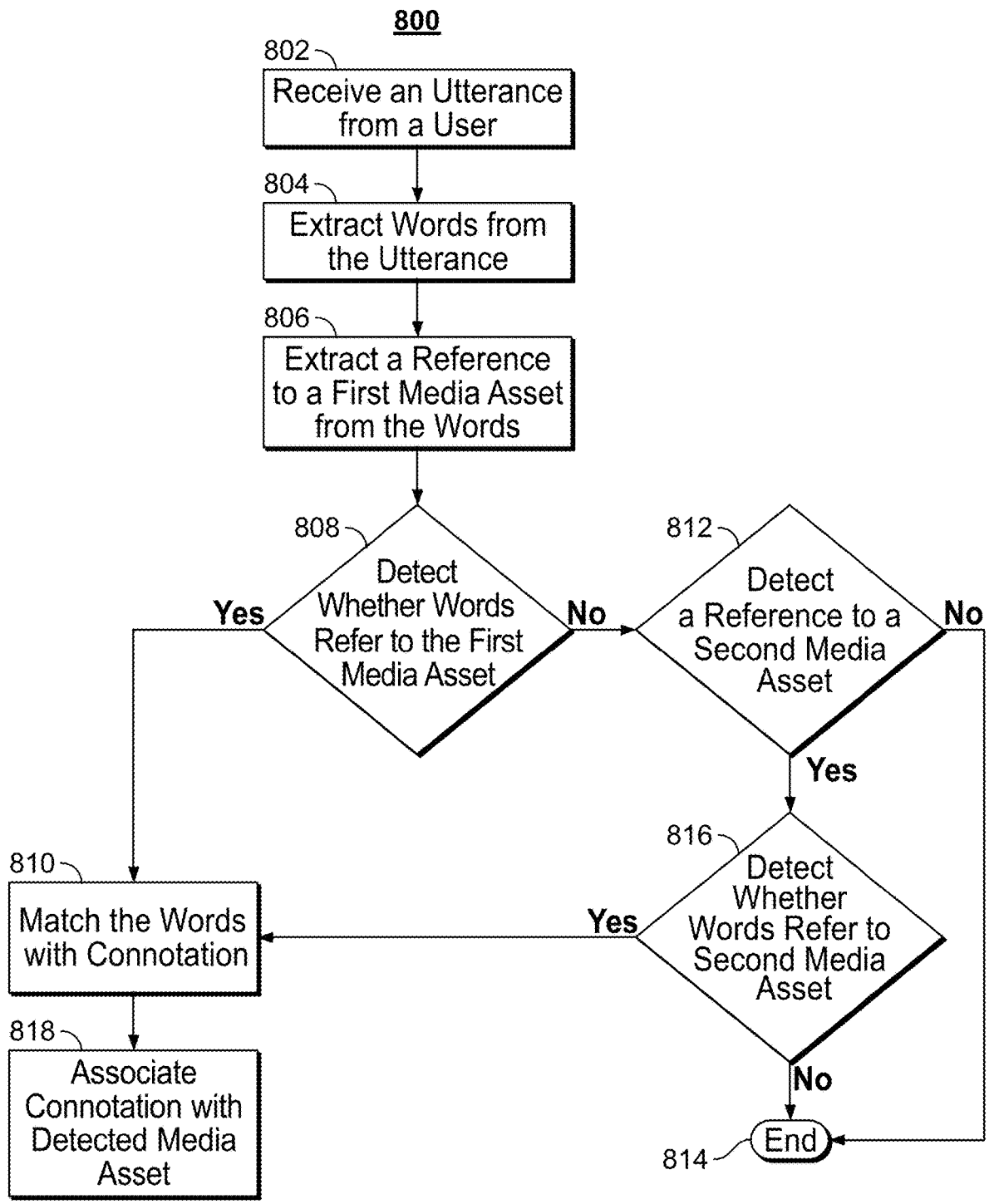
FIG. 8 depicts an illustrative flowchart of a process for parsing utterances of a user, in accordance with some embodiments of the disclosure.

FIG. 8 depicts an illustrative flowchart of a process for parsing utterances of a user, in accordance with some embodiments of the disclosure. Process 800 may be executed by control circuitry 504 (e.g. in a manner instructed to control circuitry 504 by the media guidance application). Control circuitry 504 may be part of remote server separated from the user equipment device 106 by of communication network 614.

Process 800 begins at 802, when the control circuitry 504 receives an utterance from a user. In some embodiments, the control circuitry 504 is part of the user equipment device 106 and receives an utterance from the first user 108. In some embodiments the utterance from the first user 108 may be received via any one of user devices 112, 118, and 120. The user devices 112, 118, and 120 may be connected to each other and to user equipment device 106 over a network.

At 804, the control circuitry 504 extracts words from the utterance. In some embodiments, the words uttered by the first user 108 may be extracted by control circuitry 504.

At 806, the control circuitry extracts words from the first utterance referring to at least a first media asset. Words relating to the first media asset may include words that indicate a theme. For example, the first user 108 may say words like "Batman," "Cooking," "Trivia," and "Reality shows" to refer to a first media asset that the first user 108 may be interested in. In FIG. 1, first user 108 mentions the word "Batman" in speech bubble 116 to indicate a reference to media assets related to "Batman."

At decision block 808, the control circuitry 504 detects whether the words are associated with a first media asset. As shown in FIG. 1, the control circuitry 504 detects that that first user 108 utters the words "I want to watch Batman." The control circuitry 504 extracts the words to determine that the extracted words relate to media assets associated with "Batman." For example, the control circuitry 504 detects that the words uttered by the first user are associated with media assets associated with "Batman." In case the control circuitry 504 detects that the first user 108 utters words not associated with the first media asset but possibly with a second media asset, process 800 moves to 812. In case control circuitry 504 detects that the words uttered by the first user are associated with the first media asset (e.g. "Batman"), the process moves to 810.

At 810, the control circuitry 504 matches the words with connotations. As shown in FIG. 1, the first user 108 in his utterance 116 says "I want to watch Batman." The control circuitry 504 matches words associated with the first user 108 to determine a connotation associated with the first user 108. For example, the word "want" in speech bubble 116 associated with the first user 108's intent to watch media assets associated with "Batman."

At decision block 812, the control circuitry 504 detects whether the utterance contains a reference to a second media asset. In case there is a second media asset detected in the utterance, process 800 moves to 816 to detect whether the words in the utterance 116 is contain a reference to the second media asset. For example, the second user 114 in speech bubble 110 says "Let's watch Iron Man." The control circuitry 504 detects that the words in utterance 110 are identifying a second media asset "Iron Man" different from the first media asset of "Batman."

At decision block 816, the control circuitry 504 detects whether the words from utterance 116 are associated with the second media asset of "Iron Man." In case the control circuitry 504 detects word associated with a second media asset, process 800 moves to 810 to match the words with connotation. For example, the word from the utterance 110 of the second user 114 associated with "Batman" is "boring." The word from the utterance 110 of the second user 114 associated with Iron Man is "want."

At 818, the control circuitry 504 associates connotations with a detected media asset. For example, the control circuitry 504 detects that the use of the word "want" associates a positive connotation for the first user 108 with respect to "Batman" and a positive connotation for the second user 114 with respect to "Iron Man." In addition, the use of the word "boring" associates a negative context with "Batman" for the second user 114.

Figure 9:
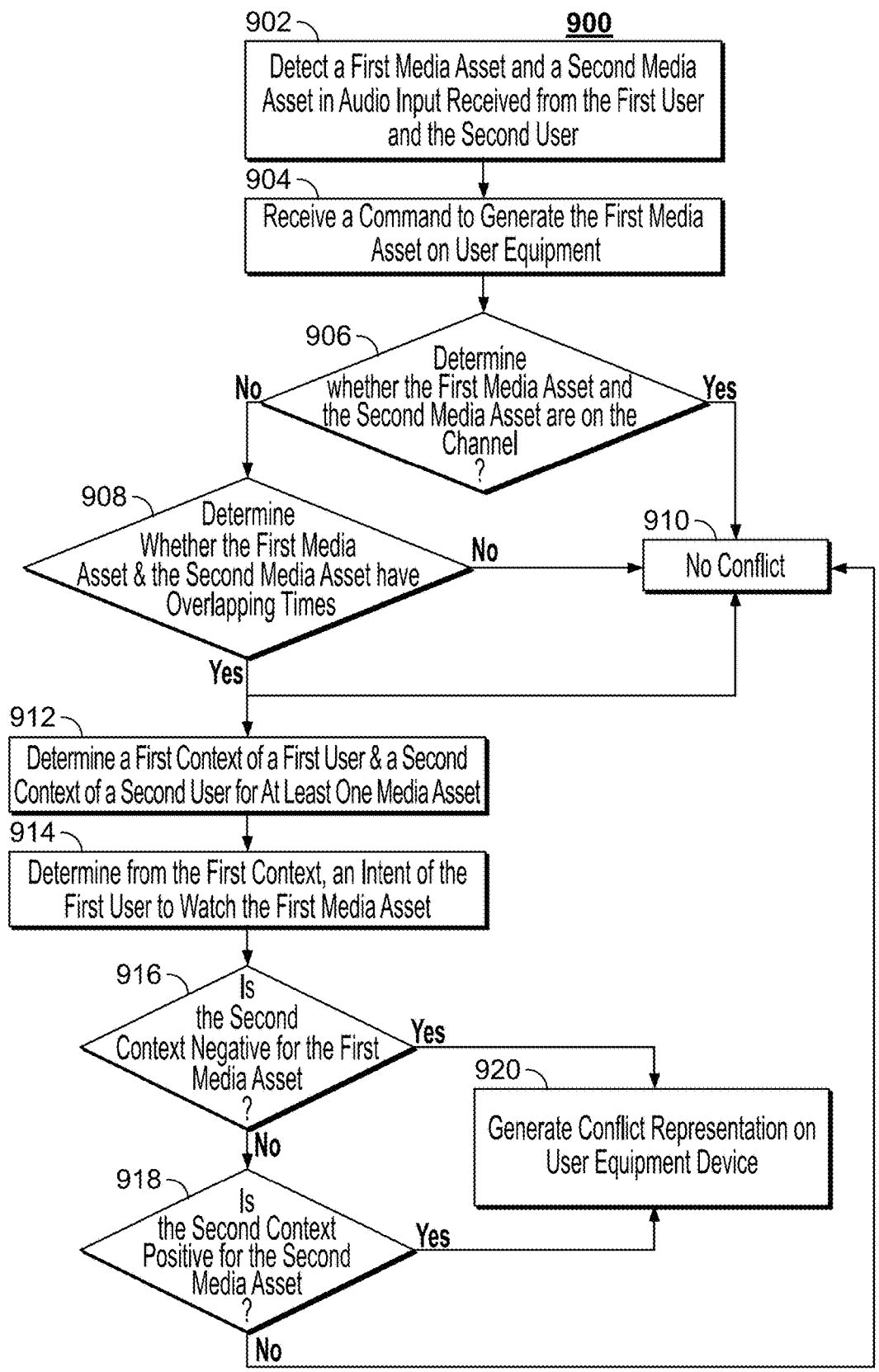
FIG. 9 depicts an illustrative flowchart of a process for detecting viewing conflicts based on user preferences, in accordance with some embodiments of the disclosure.

FIG. 9 depicts an illustrative flowchart of a process for detecting viewing conflicts based on user preferences, in accordance with some embodiments of the disclosure. Process 900 may be executed by control circuitry 504 (e.g. in a manner instructed to control circuitry 504 by the media guidance application). Control circuitry 504 may be part of remote server separated from the user equipment device 106 by of communication network 614.

Process 900 begins at 902, when the control circuitry 504 detects a first media asset and a second media asset in audio input received from the first user and the second user. For example, in FIG. 1, the audio input received by user equipment device 106 contains utterances from the first user 108 and the second user 114. The control circuitry 504 detects a first media asset ("Batman") and a second media asset ("Iron Man") in the audio input.

At 904, the control circuitry receives a command to generate the first media on the user equipment device 106. The command may be received from the first user 108 or the second user 114 from any one of user device 112, 118, and 120 that may be connected to each other and the user equipment device 106.

At decision block 906, the control circuitry 504 determines whether the first media asset and the second media asset are on the same channel. For example, the control circuitry determines if the first media asset ("Batman"), and the second media asset ("Iron Man") are being broadcast on the same channel. In case the control circuitry 504 determines that the "Batman" and "Iron Man" media assets are not on the same channel, process 800 moves to 908 to determine whether the first media asset and the second media asset are scheduled at overlapping times. In case the control circuitry determines that the "Batman" and the "Iron Man" media assets are on the same channel, the control circuitry 504 detects that there is no viewing conflict between the two users and ends the process at 910. In some embodiments, the decision of no viewing conflict is made because one channel will only broadcast one program at a particular time.

At decision block 908, the control circuitry 504 determines whether the first media asset and the second media assets have overlapping times. For example, the control circuitry 504 determines whether the "Batman" and "Iron Man" media assets are scheduled at overlapping times. In some embodiments, the times of the first media asset and the second media asset may be considered overlapping if the start time for the second media asset is scheduled within the duration of the first media asset or vice versa. In case the first media asset and the second media asset are not scheduled at overlapping times, the control circuitry 504 determines there is no viewing conflict between the first user 108 and the second user 114. The process 900 ends at 910. In case the first media asset and the second media asset are determined to be scheduled at overlapping times, process 900 moves to 912 to determine a first context of the first user and a second context of the second user for at least one media asset.

At 912, the control circuitry 504 determines a first context of the first user and a second context of the second user for at least one media asset. In order to determine the conflict of the first user and the second user, the utterances 116 and 110 of the first user and the second user respectively are parsed as described in detail in FIG. 8. Upon parsing, the first user is assigned a first context and the second user is assigned a second context. In some embodiments, the first context may include the first user 108's preference towards the first media asset ("Batman") and the second media asset ("Iron Man"). In some embodiments, the first context may contain the first user 108's preference towards the first media asset ("Batman") or the second media asset ("Iron Man"). The preferences of the first user 108 are compared with the preferences of the second user towards the first media asset or the second media asset determined similarly. For example, in FIG. 1, the preference of the first user 108 is to watch "Batman," and the preference of the second user 114 is to watch "Iron Man." In addition, the second user has a negative connotation towards the first media asset ("Batman"). In some embodiments, the context of the first user 108 and the second user 114 also depends on the watch history of the first user 108 and the second user 114. For example, the context for the first user 108 may be determined by analyzing the watch history of the first user and determining a set of tags related to the media assets watched by the first user 108. In case there is a match in the tags related to the watched media assets of the first user 108, there is an addition to the positive context of the first media asset for the first user.

At 914, the control circuitry 504 determines from the first context, intent of the first user to watch the first media asset. In some embodiments, the first user 108's intent to watch the first media asset ("Batman") may be determined by analyzing the utterance 116 of the first user 108.

At decision block 916, the control circuitry 504 determines whether the second user 114 has negative second context for the first media asset. In FIG. 1, the second user 114 in speech bubble 110 says "Batman is boring." The control circuitry 504 detects this as a negative second context for the second user towards the first media asset ("Batman"). In case the control circuitry 504 determines that the second context is negative for the first media asset ("Batman"), the process 900 proceeds to 920 to generate a representation of the viewing conflict between the first user 108 and the second user 114 on the user equipment device 106. In case the control circuitry determines that the second context is not negative for the first media asset ("Batman"), the process 900 moves to 918 to determine whether the second context is positive for a second media asset.

At decision block 918, the control circuitry 918 determines whether the second context is positive for the second media asset. For example, the second user 114 states that "Let's watch Iron Man." This is recorded by the control circuitry 504 as a preference for a second media asset ("Iron Man"). In some embodiments, the positive second context for the second media asset ("Iron Man") conflicts with a positive first context for the first media asset ("Batman").

At 920, the control circuitry generates an alert 104 of the viewing conflict between the first user 108 and the second user 114 on the user equipment device 106.

It is contemplated that the steps or descriptions of FIGS. 7-9 may be used with any other embodiment of this disclosure. In addition, the descriptions described in relation to the algorithm of FIGS. 7-9 may be done in alternative orders or in parallel to further the purposes of this disclosure. For example, in some embodiments, several instances of a variable may be evaluated in parallel, using multiple logical processor threads, or the algorithm may be enhanced by incorporating branch prediction. Furthermore, it should be noted that the process of FIGS. 7-9 may be implemented on a combination of appropriately configured software and hardware, and that any of the devices or equipment discussed in relation to FIGS. 5-6 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   detecting, at a current time, a conversation between a first user and a second user, wherein the current time is before information about a media asset is presented to the first and second users;
   identifying, based on the conversation, a first media asset and a second media asset;
   extracting, from memory, a first scheduled time of the first media asset and a second scheduled time of the second media asset, wherein the first scheduled time and the second scheduled time are after the current time;
   determining whether a timing conflict exists based on the first scheduled time and the second scheduled time; and
   in response to the determining whether the timing conflict exists, generating for presentation, via user equipment, one of a first notification that the timing conflict exists or a second notification that the timing conflict does not exist.

2. The method of claim 1, further comprising in response to the determining that the timing conflict exists, generating for presentation, via the user equipment, the first notification that the timing conflict exists.

3. The method of claim 1, further comprising in response to the determining that the timing conflict does not exist, generating for presentation, via the user equipment, the second notification that the timing conflict does not exist.

4. The method of claim 2, wherein the determining that the timing conflict exists further comprises identifying that the first scheduled time and the second scheduled time are overlapping.

5. The method of claim 4, wherein the determining that the timing conflict exists further comprises:
   extracting, from memory, a first duration of the first media asset and a second duration of the second media asset;
   identifying the timing conflict when the first scheduled time is within the second duration after the second scheduled time; and
   identifying the timing conflict when the second scheduled time is within the first duration after the first scheduled time.

6. The method of claim 1, further comprising parsing the conversation to determine:
   a preference for the first media asset by the first user;
   a dislike of the first media asset by the second user; and
   a preference of the second media asset by the second user.

7. The method of claim 6, wherein the determining the preference of the second media asset by the second user is based on a user profile of the second user.

8. The method of claim 1, further comprising parsing the conversation to identify a first utterance from the first user and a second utterance by the second user.

9. The method of claim 8, further comprising:
   determining, from the first utterance, a preference for the first media asset; and
   determining, from the second utterance, a preference for the second media asset.

10. The method of claim 9, wherein the determining the preference for the second media asset comprises determining, from the second utterance, a dislike for the first media asset, and
    wherein the determining, from the first utterance, the preference for the first media asset and the determining, from the second utterance, the dislike for the first media asset comprise:
    identifying a first user profile associated with the first user and a second user profile associated with the second user;
    retrieving, from the first user profile, a first plurality of media assets previously viewed by the first user;
    retrieving, from the second user profile, a second plurality of media assets previously viewed by the second user; and
    determining, for the first media asset, the preference provided by the first user and the dislike provided by the second user by comparing the first media asset to each of the first plurality of media assets and the second plurality of media assets.

11. The method of claim 10, wherein the comparing the first media asset to each of the first plurality of media assets and the second plurality of media assets comprises:
    retrieving from memory, a first metadata for at least one media asset in the first plurality of media assets;
    retrieving from memory, a second metadata for at least one media asset in the second plurality of media assets;
    extracting from the retrieved first metadata, a first tag describing the at least one media asset from the first plurality of media assets;
    extracting from the retrieved second metadata, a second tag describing the at least one media asset from the second plurality of media assets;
    retrieving from memory, a metadata of the first media asset, wherein the metadata comprises a third tag; and
    comparing the third tag with each of the first tag and the second tag to determine the preference for the first media asset by the first user and the dislike of the first media asset by the second user.

12. The method of claim 11, wherein the comparing the third tag with each of the first tag and the second tag further comprises:
    determining the preference for the first media asset by the first user based on the first tag matching the third tag; and
    determining the dislike of the first media asset by the second user based on the second tag not matching the third tag.

13. A system comprising: control circuitry configured to:
    detect, at a current time, a conversation between a first user and a second user, wherein the current time is before information about a media asset is presented to the first and second users;
    identify, based on the conversation, a first media asset and a second media asset;

extract, from memory, a first scheduled time of the first media asset and a second scheduled time of the second media asset;
determine whether a timing conflict exists based on the first scheduled time and the second scheduled time;
in response to determining that the timing conflict exists, generate for presentation, via user equipment, a first notification that the timing conflict exists; and
in response to determining that the timing conflict does not exist, generate for presentation, via the user equipment, a second notification that the timing conflict does not exist.

14. The system of claim 13, wherein the control circuitry is further configured, when determining that the timing conflict exists, to identify that the first scheduled time and the second scheduled time are overlapping.

15. The system of claim 14, wherein the control circuitry is further configured, when determining that the timing conflict exists, to:
extract, from memory, a first duration of the first media asset and a second duration of the second media asset;
identify the timing conflict when the first scheduled time is within the second duration after the second scheduled time; and
identify the timing conflict when the second scheduled time is within the first duration after the first scheduled time.

16. The system of claim 13, wherein the control circuitry is further configured to determine:
a preference for the first media asset by the first user;
a dislike of the first media asset by the second user; and
a preference of the second media asset by the second user.

17. The system of claim 16, wherein the control circuitry is further configured to determine the preference of the second media asset by the second user based on a user profile of the second user.

18. The system of claim 13, wherein the control circuitry is further configured to parse the conversation to identify a first utterance from the first user and a second utterance by the second user.

19. The system of claim 18, wherein the control circuitry is further configured to:
determine, from the first utterance, a preference for the first media asset; and
determine, from the second utterance, a preference for the second media asset.

20. The system of claim 19, wherein the control circuitry is further configured, when determining the preference for the second media asset, to determine, from the second utterance, a dislike for the first media asset, and
wherein the control circuitry is further configured, when determining, from the first utterance, the preference for the first media asset and when determining, from the second utterance, the dislike for the first media asset, to:
identify a first user profile associated with the first user and a second user profile associated with the second user;
retrieve, from the first user profile, a first plurality of media assets previously viewed by the first user;
retrieve, from the second user profile, a second plurality of media assets previously viewed by the second user; and
determine, for the first media asset, the preference provided by the first user and the dislike provided by the second user by comparing the first media asset to each of the first plurality of media assets and the second plurality of media assets.

21. The system of claim 20, wherein the control circuitry is further configured, when comparing the first media asset to each of the first plurality of media assets and the second plurality of media assets, to:
retrieve from memory, a first metadata for at least one media asset in the first plurality of media assets;
retrieve from memory, a second metadata for at least one media asset in the second plurality of media assets;
extract from the retrieved first metadata, a first tag describing the at least one media asset from the first plurality of media assets;
extract from the retrieved second metadata, a second tag describing the at least one media asset from the second plurality of media assets;
retrieve from memory, a metadata of the first media asset, wherein the metadata comprises a third tag; and
compare the third tag with each of the first tag and the second tag to determine the preference for the first media asset by the first user and the dislike of the first media asset by the second user.

22. The system of claim 21, wherein the control circuitry is further configured, when comparing the third tag with each of the first tag and the second tag, to:
determine the preference for the first media asset by the first user based on the first tag matching the third tag; and
determine the dislike of the first media asset by the second user based on the second tag not matching the third tag.

* * * * *